(12) United States Patent
Watkins et al.

(10) Patent No.: US 8,045,788 B2
(45) Date of Patent: Oct. 25, 2011

(54) PRODUCT SETUP SHARING FOR MULTIPLE INSPECTION SYSTEMS

(75) Inventors: Cory Watkins, Chanhassen, MN (US); Patrick Simpkins, Edina, MN (US)

(73) Assignee: August Technology Corp., Bloomington, MN (US)

( * ) Notice: Subject to any disclaimer, the term of this patent is extended or adjusted under 35 U.S.C. 154(b) by 1454 days.

(21) Appl. No.: 10/890,734

(22) Filed: Jul. 14, 2004

(65) Prior Publication Data
US 2005/0041850 A1    Feb. 24, 2005

Related U.S. Application Data

(60) Provisional application No. 60/487,152, filed on Jul. 14, 2003.

(51) Int. Cl.
*G06K 9/00* (2006.01)

(52) U.S. Cl. .......... 382/145; 29/833; 348/126; 382/149; 382/151; 382/152; 438/16

(58) Field of Classification Search .................. 382/145
See application file for complete search history.

(56) References Cited

U.S. PATENT DOCUMENTS

| | | | |
|---|---|---|---|
| 4,328,553 A | 5/1982 | Fredriksen et al. | |
| 4,464,705 A | 8/1984 | Horowitz | |
| 4,644,172 A | 2/1987 | Sandland et al. | |
| 4,823,394 A | 4/1989 | Berkin et al. | |
| 5,031,050 A * | 7/1991 | Chan | 358/3.16 |
| 5,091,963 A | 2/1992 | Litt et al. | |
| 5,455,870 A * | 10/1995 | Sepai et al. | 382/147 |
| 5,497,381 A | 3/1996 | O'Donoghue et al. | |
| 5,592,295 A | 1/1997 | Stanton et al. | |
| 5,640,200 A | 6/1997 | Michael | |
| 5,641,960 A | 6/1997 | Okubo et al. | |
| 5,659,172 A * | 8/1997 | Wagner et al. | 250/307 |
| 5,694,481 A * | 12/1997 | Lam et al. | 382/145 |
| 5,768,443 A * | 6/1998 | Michael et al. | 382/294 |
| 5,787,190 A | 7/1998 | Peng et al. | |
| 5,822,055 A | 10/1998 | Tsai et al. | |
| 5,825,913 A * | 10/1998 | Rostami et al. | 382/151 |
| 5,850,466 A | 12/1998 | Schott | |
| 5,856,844 A | 1/1999 | Battermann et al. | |
| 5,917,588 A | 6/1999 | Addiego | |
| 5,949,901 A | 9/1999 | Nichani et al. | |
| 6,137,303 A | 10/2000 | Deckert et al. | |
| 6,140,254 A | 10/2000 | Endisch et al. | |
| 6,147,357 A | 11/2000 | Nicolesco | |
| 6,153,361 A | 11/2000 | Liu et al. | |
| 6,314,379 B1 | 11/2001 | Hu et al. | |
| 6,324,298 B1 * | 11/2001 | O'Dell et al. | 382/149 |
| 6,389,688 B1 * | 5/2002 | Srivastava et al. | 29/833 |
| 6,412,326 B1 | 7/2002 | Hubbard et al. | |
| 6,421,122 B2 * | 7/2002 | Nara et al. | 356/394 |

(Continued)

*Primary Examiner* — John Lee
(74) *Attorney, Agent, or Firm* — Dicke, Billig & Czaja PLLC

(57) ABSTRACT

An inspection tool includes a camera for obtaining images of a wafer and a controller configured for performing light source flat field correction, optical image warping correction, and optical image scale correction of the images. In operation, separate inspection tools are calibrated separately to obtain a characteristic response with respect to imaging and/or illumination for each such inspection tool. A standard target is then imaged by each inspection tool and the response of each of the inspection tools is normalized to ensure uniformity of the output of each inspection tool with respect to the other inspection tools.

4 Claims, 7 Drawing Sheets

U.S. PATENT DOCUMENTS

| | | | |
|---|---|---|---|
| 6,433,352 B1* | 8/2002 | Oka | 250/559.3 |
| 6,433,561 B1* | 8/2002 | Satya et al. | 356/237.5 |
| 6,565,920 B1 | 5/2003 | Endisch | |
| 6,606,739 B2* | 8/2003 | Kanatake et al. | 382/141 |
| 6,640,151 B1* | 10/2003 | Somekh et al. | 700/121 |
| 6,643,006 B1* | 11/2003 | Hsu et al. | 356/237.2 |
| 6,708,074 B1 | 3/2004 | Chi et al. | |
| 6,771,808 B1* | 8/2004 | Wallack | 382/151 |
| 6,842,538 B2* | 1/2005 | Lee et al. | 382/224 |
| 6,937,753 B1* | 8/2005 | O'Dell et al. | 382/141 |
| 6,965,645 B2* | 11/2005 | Zhang et al. | 375/240.16 |
| 6,970,589 B2* | 11/2005 | Crell | 382/144 |
| 7,079,678 B2* | 7/2006 | Beaty et al. | 382/145 |
| 7,155,052 B2* | 12/2006 | Geshel et al. | 382/144 |
| 7,162,073 B1* | 1/2007 | Akgul et al. | 382/149 |
| 7,171,036 B1* | 1/2007 | Liu et al. | 382/145 |
| 7,231,079 B2* | 6/2007 | Okuda et al. | 382/145 |
| 7,693,323 B2* | 4/2010 | Levin et al. | 382/142 |
| 2001/0001015 A1* | 5/2001 | Ishikawa et al. | 382/149 |
| 2001/0036676 A1* | 11/2001 | Mitsuhashi et al. | 438/8 |
| 2002/0037098 A1* | 3/2002 | Beaty et al. | 382/145 |
| 2003/0030050 A1* | 2/2003 | Choi | 257/4 |
| 2003/0107770 A1* | 6/2003 | Klatchko et al. | 358/3.21 |
| 2003/0174878 A1* | 9/2003 | Levin et al. | 382/149 |
| 2003/0202178 A1 | 10/2003 | Tsuji et al. | |
| 2003/0219153 A1* | 11/2003 | Levin et al. | 382/141 |
| 2005/0008218 A1* | 1/2005 | O'Dell et al. | 382/145 |

* cited by examiner

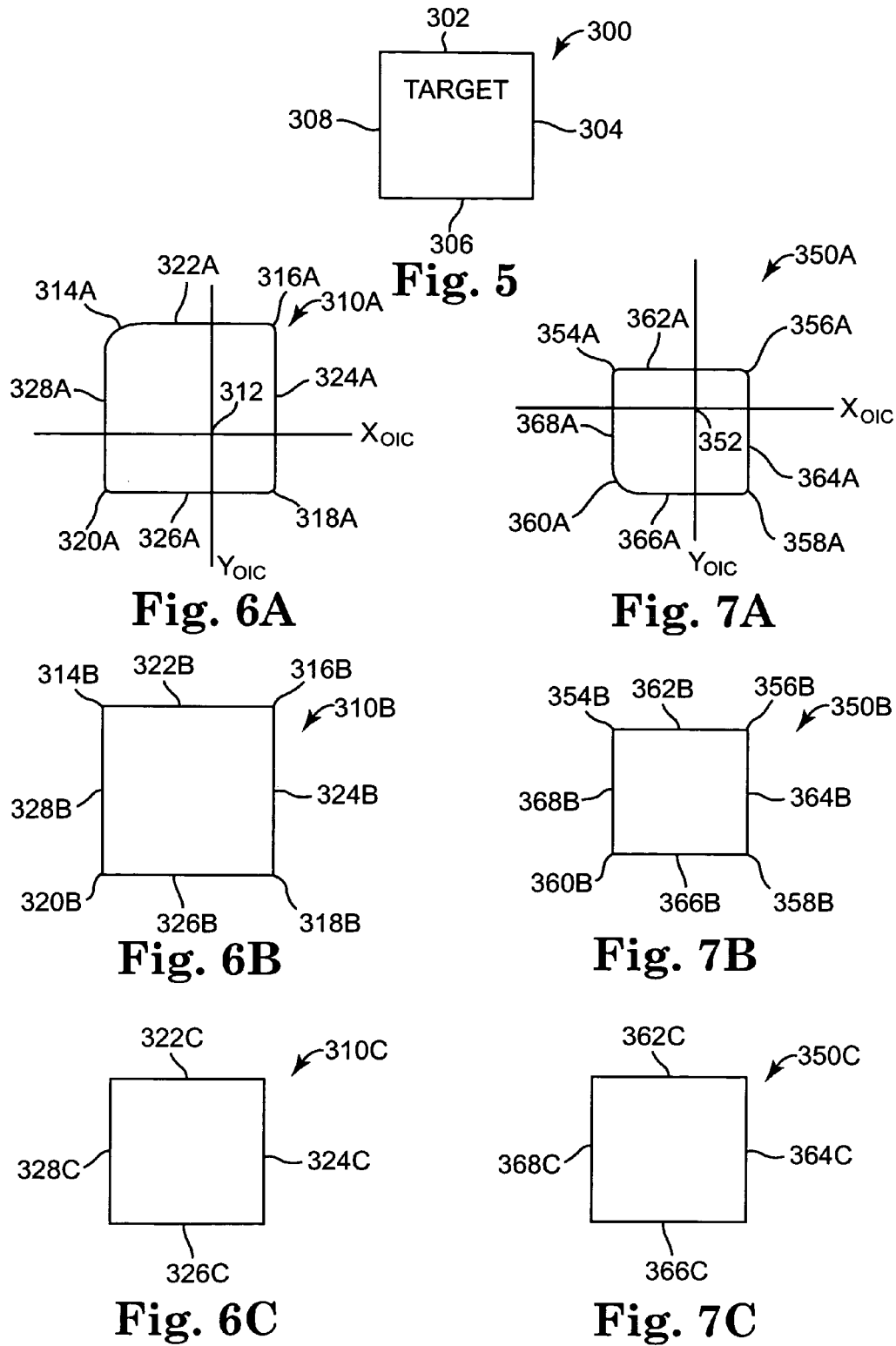

PRODUCT SETUP SHARING FOR MULTIPLE INSPECTION SYSTEMS

CROSS-REFERENCE TO RELATED APPLICATIONS

This application claims the benefit of U.S. Provisional Application Ser. No. 60/487,152, filed Jul. 14, 2003.

BACKGROUND

1. Technical Field

The present invention relates to product setup sharing prior to and during inspection.

2. Background Information

Over the past several decades, the semiconductor has exponentially grown in use and popularity. The semiconductor has in effect revolutionized society by introducing computers, electronic advances, and generally revolutionizing many previously difficult, expensive and/or time consuming mechanical processes into simplistic and quick electronic processes. This boom in semiconductors has been fueled by an insatiable desire by business and individuals for computers and electronics, and more particularly, faster, more advanced computers and electronics whether it be on an assembly line, on test equipment in a lab, on the personal computer at one's desk, or in the home electronics and toys.

The manufacturers of semiconductors have made vast improvements in end product quality, speed and performance as well as in manufacturing process quality, speed and performance. However, there continues to be demand for faster, more reliable and higher performing semiconductors.

Users of inspection equipment continue to demand better defect data thereby requiring better camera and illumination matching. This is further the case from system to system thereby assuring better correlation between inspection systems, such that the correlation in inspection results is very high.

It is known that cameras that are installed on inspection equipment are pre-set with vendor default settings for camera gain and offset. However, this often results in large variations between systems. In addition, light sources, whether halogen or strobe, can have large variations in light output (photons) for a given applied voltage. Furthermore, optics in each system have unique distortions and light transmission efficiencies that are field of view dependent. The result is that tool to tool correlation is in many cases unacceptable to the user.

As a result, inspection system users desire that all inspection systems produce the same image in regards to contrast, scale, warp, histogram, sharpness, etc. for a sample placed on two or more systems. This will best occur using product setup sharing.

SUMMARY

One embodiment of the present invention provides an inspection tool. The inspection tool comprises a camera for obtaining images of a wafer and a controller configured for performing light source flat field correction, optical image warping correction, and optical image scale correction of the images.

BRIEF DESCRIPTION OF THE DRAWINGS

Preferred embodiments of the invention, illustrative of the best mode in which Applicant has contemplated applying the principles are set forth in the following description and are shown in the drawings and are particularly and distinctly pointed out and set forth in the appended claims.

FIG. 5 is a diagram illustrating one embodiment of a target for performing optical image warping correction and optical image scale correction in a semiconductor inspection system.

FIG. 6A is a diagram illustrating an image of the target in a first semiconductor inspection system before optical image warping correction or optical image scale correction.

FIG. 6B is a diagram illustrating one embodiment of an image of the target in the first semiconductor inspection system after optical image warping correction.

FIG. 6C is a diagram illustrating one embodiment of an image of the target in the first semiconductor inspection system after optical image warping correction and optical image scale correction.

FIG. 7A is a diagram illustrating one embodiment of an image of the target in a second semiconductor inspection system before optical image warping correction and optical image scale correction.

FIG. 7B is a diagram illustrating one embodiment of an image of the target in the second semiconductor inspection system after optical image warping correction.

FIG. 7C is a diagram illustrating one embodiment of an image of the target in a second semiconductor inspection system after optical image warping correction and optical image scale correction.

Similar numerals refer to similar parts throughout the drawings.

DETAILED DESCRIPTION

Figure 1:
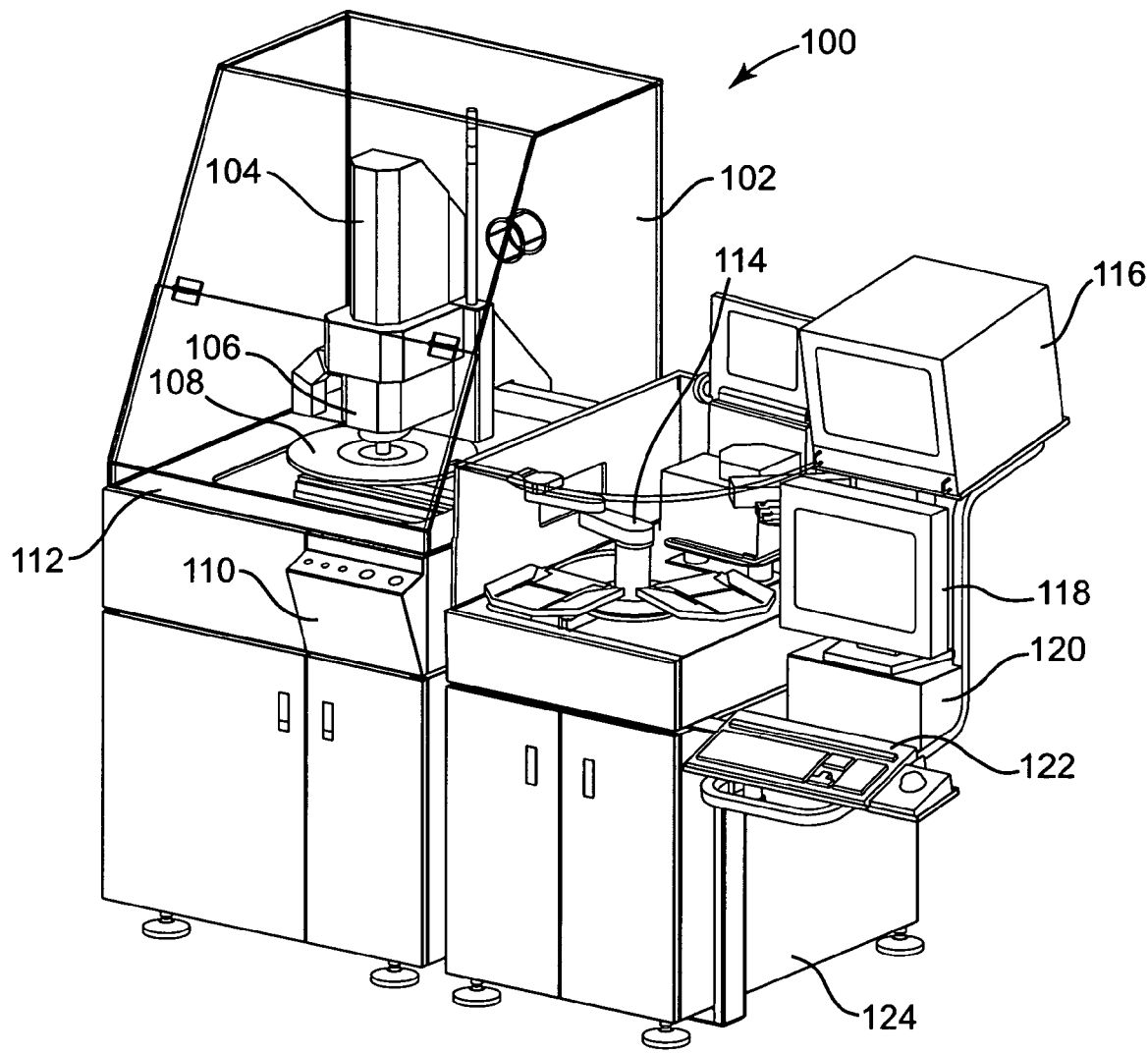
FIG. 1 is a diagram illustrating one embodiment of a semiconductor inspection system.

FIG. 1 is a diagram illustrating one embodiment of a semiconductor inspection system 100. Semiconductor inspection system 100 includes a hood 102, a camera 104, an inspection light source 106, a wafer test plate 108, a wafer alignment device 112, a control panel 110, a robot 114, a display 116, a system parameters display 118, a computer system or controller 120, a parameter input device 122, and a frame 124. In one embodiment, semiconductor inspection system 100 is an automated system that is configured to inspect substrates, such as semiconductor wafers and semiconductor die.

Camera 104 is used for visual inputting of good die during training and for visual inspection of other unknown quality die during inspection. The camera may be any type of camera capable of high resolution inspection. An example of such a camera is a charge-coupled device (CCD) inspection camera used to capture die or other images during defect analysis. In one embodiment, camera 104 is a high resolution CCD camera that provides high resolution gray scale images for inspection.

Robot 114 provides a wafer to test plate 108 for inspection. Wafer alignment device 112 aligns each and every wafer at the same x, y, and θ location or x, y, z, and θ location. Camera 104 is focused on wafer test plate 108 for inspecting wafers.

Computer controlled illumination, including inspection light source 106, is integrated into and with inspection camera 104 and optics to complete the wafer imaging process. Alternatively, the illumination system may be coupled to camera 104 and optics so long as the illumination system works in conjunction with camera 104. In a strobing environment, the illumination must occur simultaneously or substantially simultaneously with camera 104 shuttering, which is in one example a high speed electronic shuttering mechanism. Alternatively, in a non-strobing environment, the illumination is typically continuous or as needed. Illumination may be by any known illumination means such as high intensity lights, lasers, florescent lights, arc discharge lamps, incandescent lamps, etc.

Parameter input device 122 is for inputting parameters and other constraints or information. These parameters, constraints, and information include sensitivity parameters, geometry, die sizes, die shape, die pitch, number of rows, number of columns, etc. It is contemplated that any form of input device will suffice, including a keyboard, mouse, scanner, infrared or radio frequency transmitter and receiver, etc.

Display 116 is for displaying the view being seen by camera 104 presently or at any previously saved period. The display is preferably a color monitor or other device for displaying a color display format of the image being viewed by camera 104 for the user's viewing, or alternatively viewing an image saved in memory. In addition, the system parameters display 118 is also available for displaying other information as desired by the user, such as system parameters.

Computer system or controller 120 or other computer device having processing and memory capabilities is for saving the inputted good die, developing a model therefrom, and comparing or analyzing other die in comparison to the model based upon defect filtering and sensitivity parameters to determine if defects exist. Computer system 120 also saves flat field correction data, optical image warping correction data, and optical image scale correction data, which are described below. In addition, computer system 120 is used to perform all other mathematical and statistical functions as well as all operations. In one embodiment, computer system 120 is of a parallel processing DSP environment.

Semiconductor inspection system 100, according to one embodiment, is camera and illumination matched, such that semiconductor inspection systems that are camera and illumination matched to semiconductor inspection system 100 provide substantially the same camera output in response to substantially the same camera input and inspection light source setting. Camera and illumination matching involves matching camera gain and offset settings and illumination light source settings of multiple semiconductor inspection systems. Camera and illumination matching is described in further detail in U.S. patent application Ser. No. 10/890,862 entitled "CAMERA AND ILLUMINATION MATCHING FOR INSPECTION SYSTEM" filed Jul. 14, 2004, which is incorporated herein by reference.

In addition, semiconductor inspection system 100, according to one embodiment, is light source flat field corrected, optical image warping corrected, and optical image scale corrected, such that semiconductor inspection systems that have also been light source flat field corrected, optical image warping corrected, and optical image scale corrected provide substantially the same inspection image in response to substantially the same inspection target. By performing light source flat field correction, optical image warping correction, and optical image scale correction, a first semiconductor inspection system can be trained for inspecting a product and the training information can be loaded onto a second semiconductor inspection system for inspecting the product without having to train the second semiconductor inspection system. This sharing of training information by two or more corrected inspection systems is termed product setup sharing.

The product setup sharing method of one embodiment of the present invention occurs via the use of mathematical techniques or algorithms used to reduce differences in digital images such as those acquired by semiconductor inspection system 100. In general, the method according to one embodiment is as follows: Two or more semiconductor inspection systems are calibrated for camera response and illumination matching. Then, for light source flat field correction, a target of uniform reflectance is placed in each semiconductor inspection system, such as semiconductor inspection system 100. Each semiconductor inspection system locates the target in the x, y, and z directions. At the desired illumination setting of the light source, such as light source 106, the average gray value of the charge-coupled device (CCD) array or other sensor array of the camera, such as camera 104, is computed. At each pixel location of the sensor array, a floating-point factor (normalizing factor) is computed by dividing the average gray value of the sensor array by the gray value at that pixel. The normalizing factor computed at each pixel is then multiplied to each image being inspected at the proper pixel location. Normalized pixel gain and offset values can also be supplied by the camera matching equipment to correct for individual CCD array pixels. The above method corrects for non-uniformity in the light source, such as light source 106.

The following steps measure and correct for optical scale and optical distortion (warping): (1) A target with objects of known size and location are placed in semiconductor inspection system 100; (2) semiconductor inspection system 100 locates the target in the x, y, and z directions and finds the location of each object on the target; (3) the optical image center, which is the center of the optical distortion field, is found; (4) using the found object locations on the target and real world locations of the objects on the target, the optical scale and optical distortion are measured; and (5) interpolation regions are defined for the found objects on the target, the image distortion is corrected, and the image is scaled to a desired value.

Figure 2:
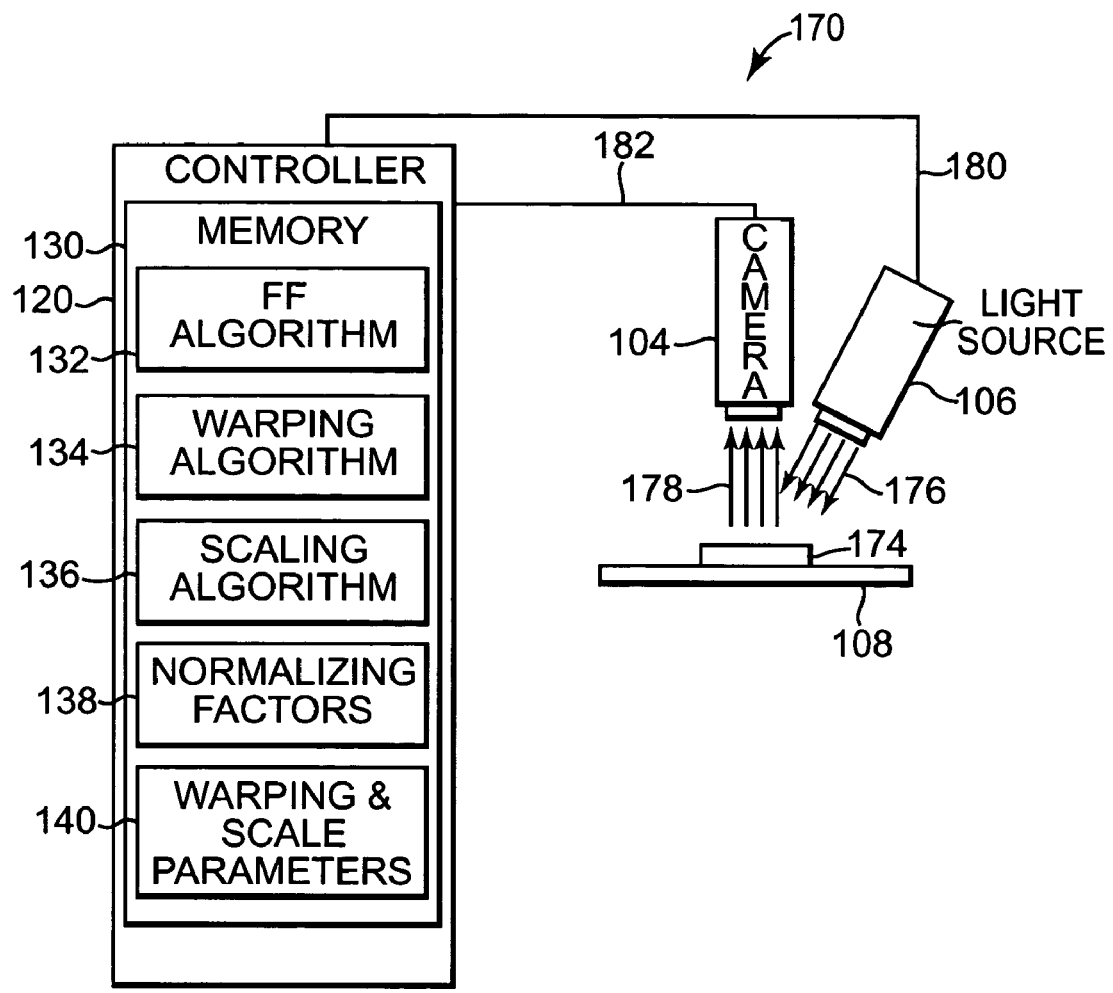
FIG. 2 is a schematic diagram illustrating one embodiment of a system for performing product setup sharing in a semiconductor inspection system.

FIG. 2 is a schematic diagram illustrating one embodiment of a system 170 for performing corrections for product setup sharing. In one embodiment, system 170 is incorporated in semiconductor inspection system 100 and performs light source flat field correction, optical image warping correction, and optical image scale correction of semiconductor inspection system 100. System 170 includes computer system or controller 120, camera 104, inspection light source 106, target 174, and wafer test plate 108. Controller 120 is electrically coupled to inspection light source 106 through communication link 180 and to camera 104 through communication link 182. Target 174 is positioned on wafer test plate 108 underneath camera 104 and illuminated by inspection light source 106. Target 174 is a sample having objects of known sizes and locations. Controller 120 controls the intensity of light 176 from inspection light source 106 through communication link 180 by controlling a voltage applied to inspection light source 106.

Light 178 reflected from target 174 impinges on the CCD array or other sensor array of camera 104. Controller 120 receives the image data from camera 104 through communication link 182, including the gray values of the individual pixels of the CCD array of camera 104. Controller 120 computes the average gray value for the CCD array of camera 104 from the gray values of the individual pixels of the CCD array of camera 104.

In one embodiment, controller 120 includes a memory 130 for storing a flat field correction algorithm 132, a warping algorithm 134, a scaling algorithm 136, normalizing factors 138, and warping and scale parameters 140. To best understand the algorithms, the following definitions are used. Optical Image Center or Image Center (IC) is the center of the optical system that can and most the time is different than the center of the camera CCD array. The center of the optical system is defined as the x, y pixel location that minimizes nonlinear distortion to a least squares error fit. The center of the optical system is used as the origin of image scale adjustments and image warping corrections.

Optical Image Warping (OIW) is defined as a nonlinear optical distortion, which most of the time is located in the corners of an image. OIW is an error that is localized and may affect only portions of an image that may or may not be used in the inspection.

Optical Image Scale (OIS) is defined as the ratio of pixels to real world dimensions, such as microns. The OIS is a function of the CCD array and optics and a typical ratio might be 5 microns/pixel for a 1.25 magnification objective. OIS affects the complete image across its field of view.

Light Flat Fielding (FF) is defined as the amount of non-uniform light response across the field of view and can be a function of the light source (i.e., bulb) optics, and CCD array response. FF is an error that is localized and may affect only portions of an image that may or may not be used in the inspection.

Laplacian of Gaussian Filter (LOG) is a 2nd derivative edge detection filter that uses its zero crossing property to find the edge location.

Zero Cross Detect (ZCD) is a filter that finds the zero crossings in the LOG filter output, which are the edge locations.

Calibration Grid Target (CGT) is a plate of glass fabricated with two different regions of light reflectivity. One region of reflectivity contains objects, such as circles or squares, that have known feature sizes and locations. The CGT is used to measure OIS and OIW. In one embodiment, a grid region of squares can be measured so it is National Institute of Standards and Technology (NIST) traceable.

Since the product setup operation for an inspection system may be time consuming, customers with multiple systems could benefit from being able to train one semiconductor inspection system on a certain product setup then store that information to a network. Other semiconductor inspection systems could then use that product setup located on the network. At the present time, system-to-system variations can cause large errors that result in product setups not being able to be shared between semiconductor inspection tools.

Possible sources of system-to-system error have been identified and include OIS, OIW, and FF. One embodiment of the present invention measures and corrects for OIS, OIW, and FF errors. Below is a description of the mathematical models used to characterize OIS, OIW, and FF along with the techniques used to correct for each.

A number of images are collected on different semiconductor inspection tools and the images are stored on a shared drive on a network. Thereafter, the errors for OIS, OIW, and FF on the relevant images are characterized, and then corrections for OIS, OIW, and FF errors are applied independently so that the effect of each correction can be measured. The magnitude of errors before corrections for OIS, OIW, and FF along with the magnitude of errors after corrections are often reviewed. In one embodiment, multiple images are taken of the same wafer on one system with a small jog in x, a small jog in y, and a small rotation to have a baseline of what the error is after displacement and angle registration on images from the same system.

In one embodiment, the measurement and correction techniques for OIS, OIW, and FF described herein are implemented in code. A WIN32 Application Programming Interface (API) User Interface (UI) or the like accesses the routines so as to quickly take images from different systems and investigate the errors before and after corrections.

In one embodiment, the images are corrected for FF first and then corrected for OIW and OIS at the same time.

Light Source Flat Field (FF)

Figure 3A:
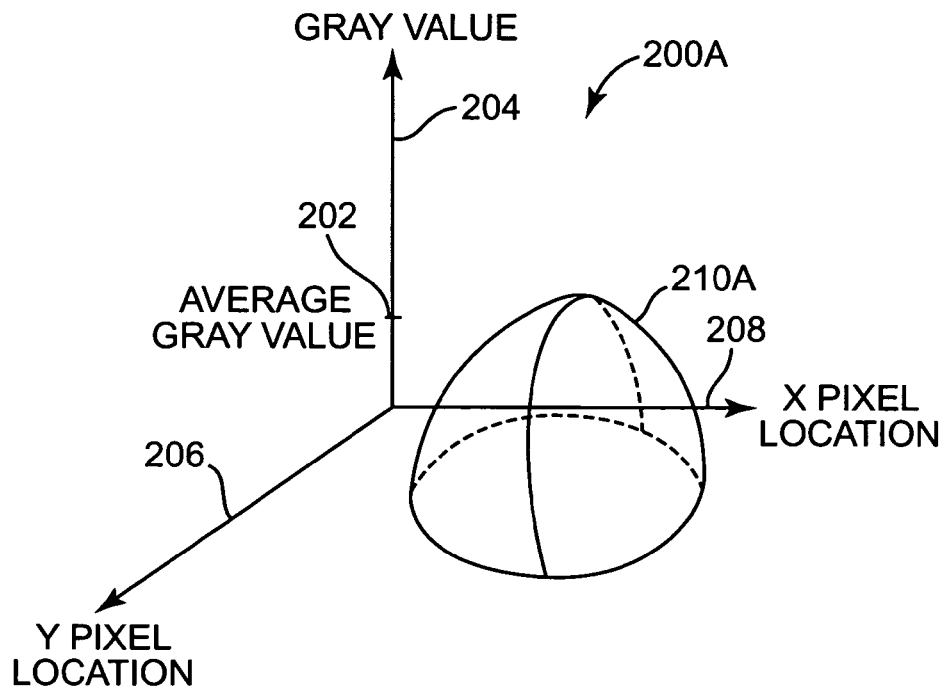
FIG. 3A is a graph illustrating one embodiment of gray values for individual pixels of a sensor array of a camera before light source flat field correction is performed in a semiconductor inspection system.

FIG. 3A is a graph 200A illustrating one embodiment of gray values for individual pixels of a sensor array of camera 104 before light source flat field correction is performed in semiconductor inspection system 100. Graph 200A includes an x pixel location axis 208, a y pixel location axis 206, and a gray value axis 204. The gray value at each pixel of camera 104 is indicated at 210A. The average gray value for all the pixels indicated at 210A is indicated at 202. As illustrated in graph 200A, the gray values of each individual pixel of camera 104 vary due to the drop off of light from light source 106.

Figure 3B:
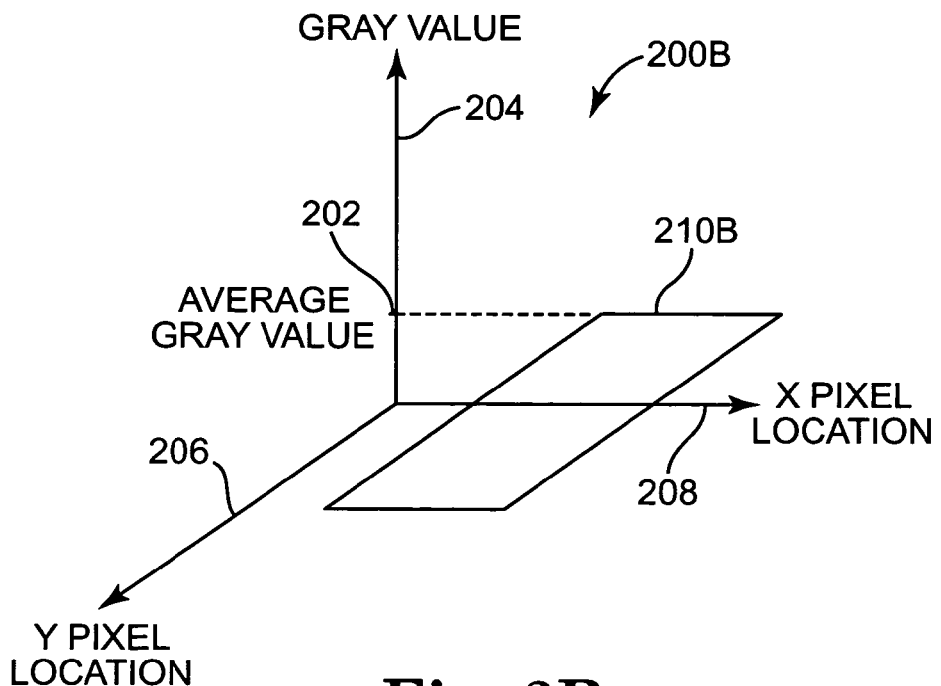
FIG. 3B is a graph illustrating one embodiment of gray values for individual pixels of a sensor array of a camera after light source flat field correction is performed in a semiconductor inspection system.

FIG. 3B is a graph 200B illustrating one embodiment of gray values for individual pixels of the sensor array of camera 104 after light source flat field correction is performed in semiconductor inspection system 100. Graph 200B includes x pixel location axis 208, y pixel location axis 206, and gray value axis 204. The gray value of each pixel of camera 104 is indicated at 210B. Every pixel of camera 104 has been adjusted to the average gray value indicated at 202.

For FF, it is known that for a number of reasons, the light profile across a field of view of the camera can vary from system to system or within a system after a bulb has been changed or possibly after the bulb has aged. The steps for correcting this problem according to one embodiment are listed below. The effect of the flat fielding error is a gradual drop off from the brightest location in the image.

Step 1 involves acquiring and saving to disk images of an illumination wafer (i.e., a wafer of substantially uniform reflectance) at different light source power settings for each objective during illumination calibration. Frame averaging can be used to help reduce gaussian system noise. The images are filtered to remove noise from defects and contamination. In one embodiment, a histogram type filter or other type of filter may be used. The filter size may be of any size; however, one size that is suggested in one embodiment is a filter size of around 20 pixels by 20 pixels that is used on a histogram of that region of interest (ROI). The center value is replaced with the histogram bin that contains the highest number of pixels. The physical basis for this filter lies in the fact that the probability is that the highest pixels in that ROI have the same reflectivity. One technique is an edge detect filter (LOG/ZCD/Gradient) that defines the boundaries of the defect then a distance transform to replace the defect with its nearest valid neighbor value.

Step 2 occurs after a product setup is loaded where an image corresponding to that power is loaded in the inspection system. If an image has not been saved at that power level, then an interpolated image is created from images of power levels above and below that level. Since multiple mirrors are used to calibrate an objective, images need to be from the same objective.

Step 3 occurs once an image is available on which the average gray value may be found. A floating ratio matrix is created, which is the ratio of the average gray value to the gray value at each pixel. In one embodiment, on average, the light can fall off from the high point to low point by 10%. For example, if the average CCD array gray value is 200 with the low at 190 and the high at 210, then at the low pixel value the ratio is 200/190=1.0526 and the ratio at the high value location is 200/210=0.952. The ratio buffer is then downloaded to controller 120 after a product setup has been loaded and multiplied at run time against the inspection ROI.

In one embodiment, rather than just acquiring images from one region of the illumination wafer and then fitting the data to a third order polynomial to interpolate the images at any power level setting, one embodiment of the present invention also allows for the saving of the filtered illumination wafer images to disk and then loading them when loading a product setup.

It is noted that the ratio matrix for flat fielding may also contain a correction of gain errors in cameras that have digital gain settings. Furthermore, if desirable, an individual pixel gain may be added and offset with data acquired from the camera matching equipment.

Since the light flat field profile can change from replacing a light bulb, this calibration is preferably performed at least as often as a bulb is changed. It most likely will need to be run each time the illumination calibration changes a lookup value for a bulb or each time the illumination calibration is run.

Figure 4:
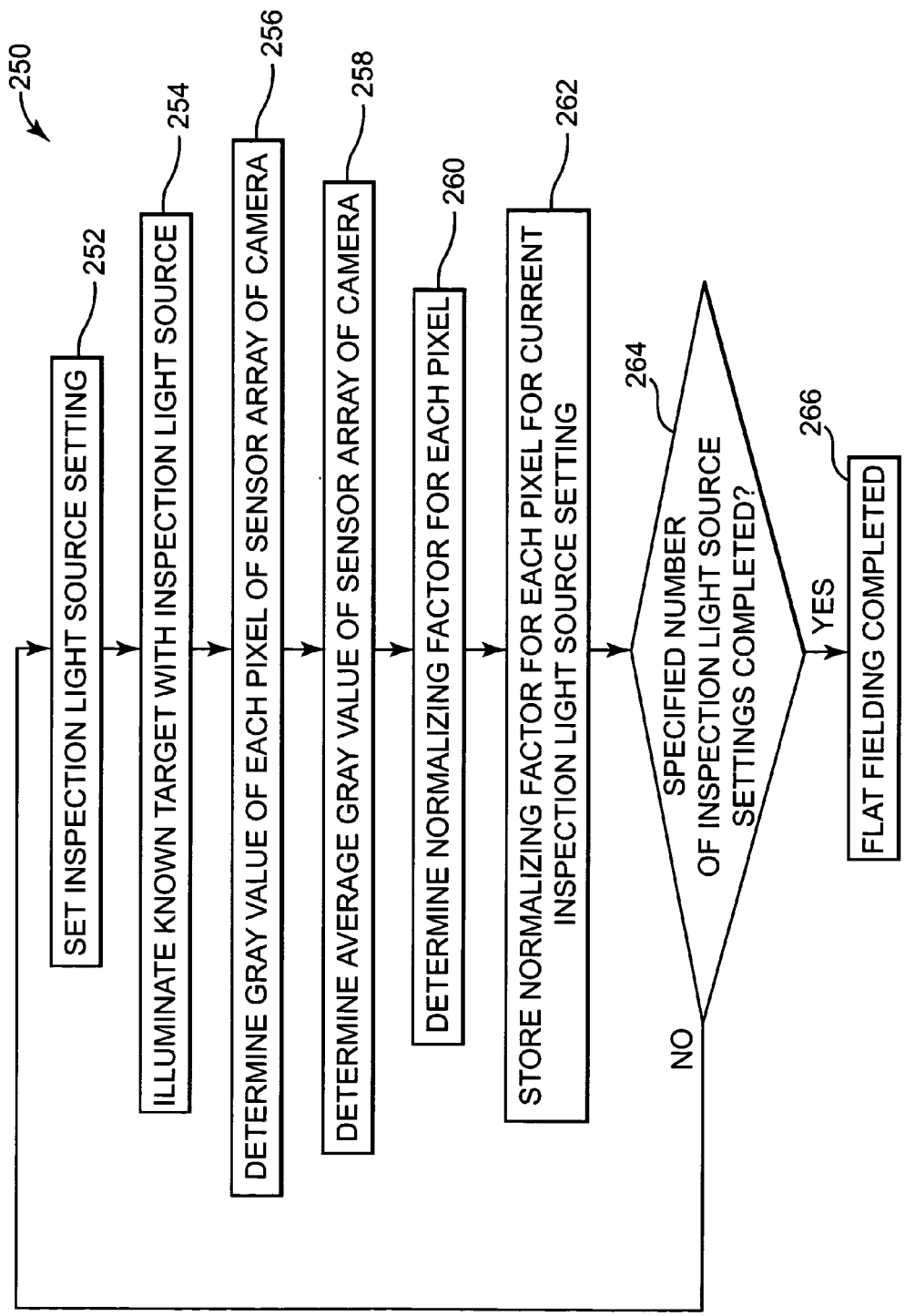
FIG. 4 is a flow diagram illustrating one embodiment of a method for performing light source flat field correction on a semiconductor inspection system.

FIG. 4 is a flow diagram illustrating one embodiment of a method 250 for performing light source flat field correction on semiconductor inspection system 100. With further reference to FIG. 2, at 252, inspection light source 106 is set to a first setting of a plurality of settings. At 254, light source 106 illuminates target 174. At 256, camera 104 determines the gray value of each pixel of the sensor array of camera 104 from the light 178 reflected off of target 174. At 258, controller 120 determines the average gray value of the sensor array of camera 104 based on the gray values of each individual pixel of the sensor array of camera 104.

At 260, controller 120 determines a normalizing factor for each pixel of the sensor array of camera 104 to compensate for the difference between the actual pixel gray value and the average gray value of the sensor array. At 262, controller 120 stores the normalizing factors for each pixel of the sensor array of camera 104 for the current inspection light source 106 setting. At 264, controller 120 determines whether each light source setting of the plurality of light source settings has been completed and a normalizing factor has been found for each pixel at that light source setting.

If controller 120 determines that each light source setting of the plurality of light source settings has not been set, control returns to block 252 where the inspection light source setting is adjusted to the next light source setting of the plurality of light source settings and the process repeats. If controller 120 determines that all light source settings of the plurality of light source settings have been completed, light source flat field correction is complete at 266.

Optical Image Scaling (OIS) and Optical Image Warping (OIW)

FIG. 5 is a diagram illustrating one embodiment of a target 300 for performing optical image warping correction and optical image scale correction in semiconductor inspection system 100. Target 300 includes sides 302-308. In one embodiment, target 300 is a square and sides 302-308 are equal. Target 300 is simplified for purposes of illustration. An actual target for performing optical image warping correction and optical image scale correction includes many objects thereon having known sizes and locations.

FIG. 6A is a diagram illustrating an image 310A of target 300 in a first semiconductor inspection system before optical image warping correction or optical image scale correction. Image 310A includes an optical image center 312 defined by the intersection of the x optical image center ($X_{OIC}$) and the y optical image center ($Y_{OIC}$). Image 310A includes corners 314A-320A and sides 322A-328A. Corner 314A, being farther away from optical image center 312, is more rounded than corners 316A-320A. This rounding of corners 314A-320A is due to optical image warping. In addition, the length of sides 322A-328A appear larger than sides 302-308 of target 300. The difference in the length of sides 322A-328A is due to optical image scaling.

FIG. 6B is a diagram illustrating one embodiment of an image 310B of target 300 in the first semiconductor inspection system after optical image warping correction. Image 310B includes perpendicular corners 314B-320B and sides 322B-328B. Because image 310B has been corrected for optical image warping, corners 314B-320B are now square.

FIG. 6C is a diagram illustrating one embodiment of an image 310C of target 300 in the first semiconductor inspection system after optical image warping correction and optical image scale correction. Image 310C includes sides 322C-328C. Sides 322C-328C are substantially equal to the length of sides 302-308 of target 300. Image 310C has been optical image warping corrected and optical image scale corrected and now is an accurate representation of target 300.

FIG. 7A is a diagram illustrating one embodiment of an image 350A of target 300 in a second semiconductor inspection system before optical image warping correction and optical image scale correction. Image 350A includes an optical image center 352 defined by the intersection of the x optical image center ($X_{OIC}$) and the y optical image center ($Y_{OIC}$). Image 350A includes corners 354A-360A and sides 362A-368A. Corner 360A, being farther away from optical image center 352, is more rounded than corners 354A-358A. This rounding of corners 354A-360A is due to the optical image warping. In addition, the length of sides 362A-368A appear smaller than sides 302-308 of target 300. The difference in the length of sides 362A-368A is due to optical image scaling.

FIG. 7B is a diagram illustrating one embodiment of an image 350B of target 300 in the second semiconductor inspection system after optical image warping correction. Image 350B includes perpendicular corners 354B-360B and sides 362B-368B. Because image 350B has been corrected for optical image warping, corners 354B-360B are now square.

FIG. 7C is a diagram illustrating one embodiment of an image 350C of target 300 in the second semiconductor inspection system after optical image warping correction and optical image scale correction. Image 350C includes sides 362C-368C. Sides 362C-368C are substantially equal to the length of sides 302-308 of target 300. Image 350C has been optical image warping corrected and optical image scale corrected and now is an accurate representation of target 300.

Since the first semiconductor inspection system and the second semiconductor inspection system have been corrected to provide substantially equivalent images of target 300 as illustrated in FIGS. 6C and 7C, respectively, one of the first semiconductor inspection system and the second semiconductor inspection system can be trained on a product and both the first semiconductor inspection system and the second semiconductor inspection system can use that training to inspect the product.

In the past, the measurement of OIS and OIW have traditionally been done by the steps below: (1) Fabrication of target with objects of known distances; (2) find the center of each object using image processing techniques; (3) fit the found data to a least squares linear regression on an equation that takes into account scale, rotation, and warping; and (4) by using the coefficients from the least squares fit, optical scale and warping can be adjusted and/or corrected. The embodiment of the solution provided herein uses a hybrid solution between a least squares approach and grid interpolation that uses the strong points of each method.

For step 1 above, a target containing grid patterns of circles, squares, or other shapes is used. In one embodiment, five patterns of circles have diameters and spacing set up to be used with multiple objectives of a semiconductor inspection system. In some cases, the user may not be sure of the true position accuracy on center to center spacing, but an estimate may be used. In some cases, only targets with patterns of squares can be measured or verified with calibrated equipment so as to make the targets NIST traceable. Image processing sub-pixel techniques used on edges appear to work much better on straight lines than on curved lines of a circle, so using targets made from squares is preferred.

For step 2, a blob technique is used along with an edge detect technique. The edge detect technique uses a LOG filter with ZCD and then a linear regression on the equation of an ellipse. Different sub-pixel techniques are used on the edges of the ellipse along with an error checking routine that removes points from the ellipse fit until the average error in the ellipse fit is not reduced. The advantage of the edge detect is that one can measure the sub-pixel error in the fit that allows for error checking. Small defects in the target can cause errors in its center position estimate that cannot be detected with a blob routine. The same type of edge detect error checking can be applied to square, rectangle, or any other suitable model based target. Error checking is extremely important for optical measurements. It is recommended, in one embodiment, that the user use many more objects on the target than required so damaged or contaminated objects can be dropped out or not used.

For step 3, one embodiment of the invention uses equations of the form given in Equations I-II below to determine the optical image center used to model the optical scale, grid rotation, grid offset and optical warping.

$$X' = A0 + A1*X + A2*Y + A3*X^3 + A4*Y^3 + A5*X^5 + A6*Y^5 \quad \text{Equation I}$$

Where:
A0-A6=coefficients to minimize error;
X=Xp−Xoic;
Y=Yp−Yoic;
X'=Xideal−Xoic;
Xp=found object location in x pixel coordinates;
Xoic=optical image center in x pixel coordinates;
Yp=found object location in y pixel coordinates;
Yoic=optical image center in y pixel coordinates; and
Xideal=real world object location in x pixel coordinates.

$$Y' = B0 + B1*X + B2*Y + B3*X^3 + B4*Y^3 + B5*X^5 + B6*Y^5 \quad \text{Equation II}$$

Where:
B0-B6=coefficients to minimize error;
X=Xp−Xoic;
Y=Yp−Yoic;
Y'=Yideal−Yoic;
Xp=found object location in x pixel coordinates;
Xoic=optical image center in x pixel coordinates;
Yp=found object location in y pixel coordinates;
Yoic=optical image center in y pixel coordinates; and
Yideal=real world object location in y pixel coordinates.

The procedure is to use the above linear regression and locate the optical image center. The image center is located at the X, Y pixel location that gives a minimum overall error in the fit. This is termed "goodness of fit."

Once the image center is found, the warp error at each location can be used to set up an interpolation grid. A simulation showed extremely small errors resulted from an interpolation grid. The warp errors at each calibration point can be used with bilinear interpolation to compute a warp error at each pixel location that is termed "difference matrices for x and y." Once the two difference floating point matrices are computed, scale adjustments can be added to the matrices. The above matrices are then downloaded to controller 120 when the inspection system program starts up. In one embodiment, the size of the matrices (2 of them) are 1024×1024 and are floating point.

In one embodiment, the DSP code for controller 120 includes a loop to correct for any image warping errors along with any scaling change. The software loop consists of: (1) using the offset buffers to find which pixels in the original images should be used for interpolation; and (2) performing a bilinear interpolation to arrive at a new gray value in the corrected/scaled image.

Controller 120, in one embodiment, performs scale adjustment only, warp correction only, and scale and warp correction at the same time. The error between images is reduced more by performing both scale and warping at the same time, because only one bilinear interpolation is performed.

The optics scale and warping should not change over time. The image center may change over time, because of mechanical issues. So the frequency of calibration would not have to be high, which means the number of targets purchased by the customer may be lower than the illumination wafer.

Figure 8:
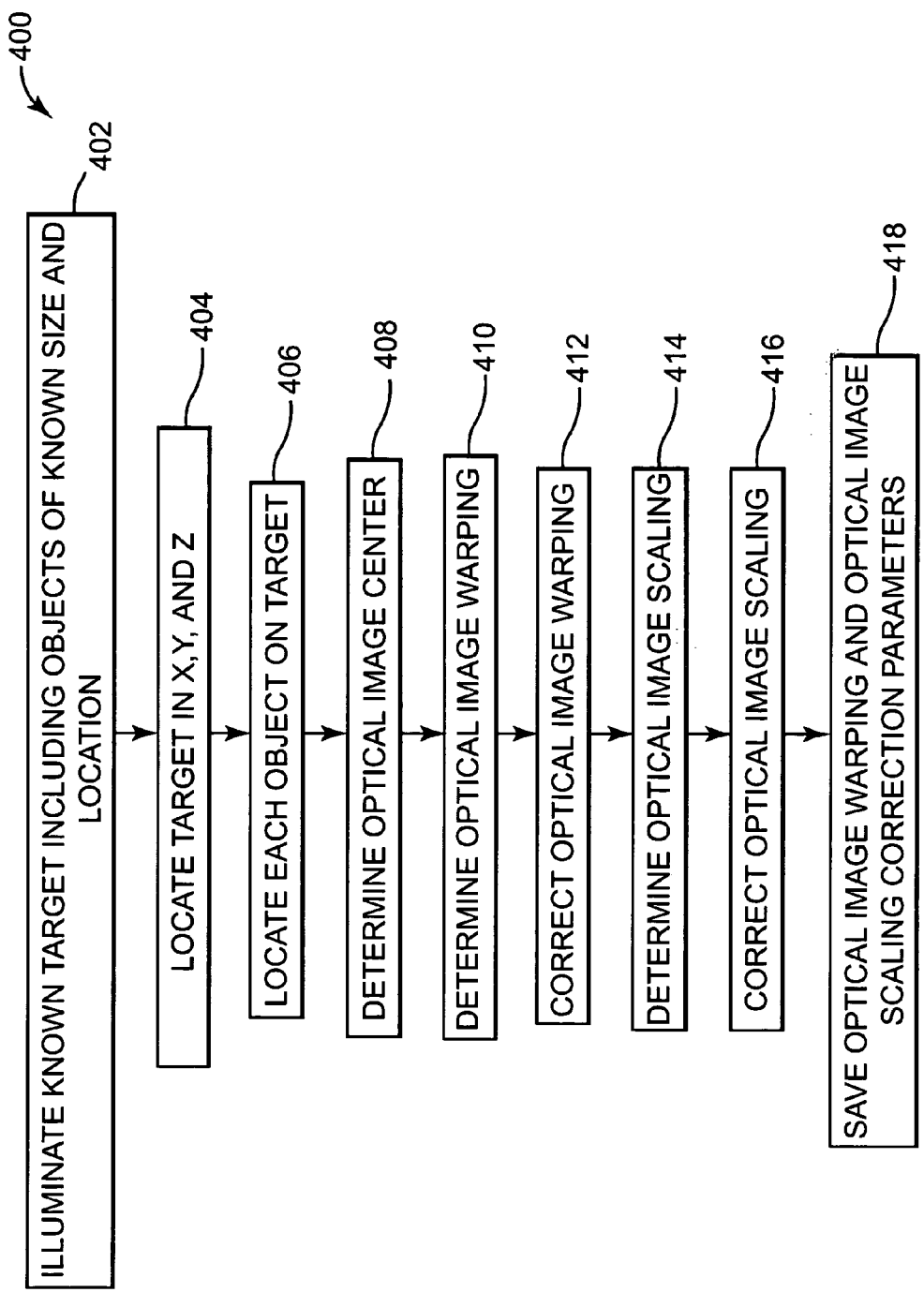
FIG. 8 is a flow diagram illustrating one embodiment of a method for performing optical image warping correction and optical image scale correction in a semiconductor inspection system.

FIG. 8 is a diagram illustrating one embodiment of a method 400 for performing optical image warping correction and optical image scale correction in semiconductor inspection system 100. With further reference to FIG. 2, at 402, light source 106 illuminates known target 174, where target 174 includes objects of known size and location. At 404, semiconductor inspection system 100 and camera 104 locates target 174 in the x, y, and z dimensions. At 406, semiconductor inspection system 100 and camera 104 locate each object on target 174.

At 408, controller 120 determines the optical image center of the image from camera 104. At 410, controller 120 determines the optical image warping of the image from camera 104. At 412, controller 120 corrects the image to correct for the optical image warping. At 414, controller 120 determines the optical image scale of the image from camera 104. At 416, controller 120 corrects the image to correct for optical image scale based on the determined optical image scale and the actual dimensions and locations of the objects on target 174. At 418, controller 120 saves the optical image warping and optical image scale correction data to memory for use during inspections.

Figure 9:
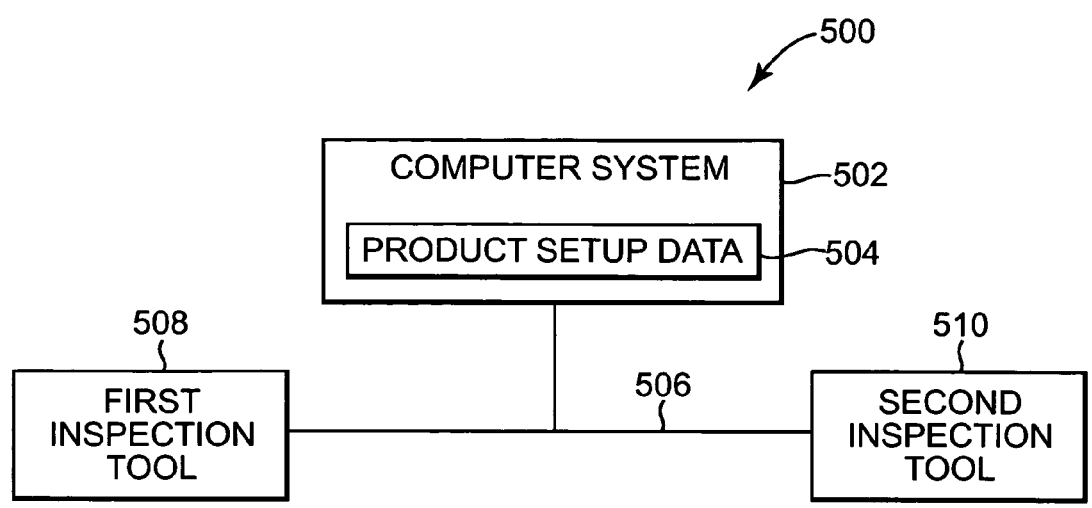
FIG. 9 is a block diagram illustrating one embodiment of a semiconductor inspection system configured for product setup sharing.

FIG. 9 is a block diagram illustrating one embodiment of a semiconductor inspection system 500 configured for product setup sharing. Semiconductor inspection system 500 includes a computer system 502, a first inspection tool 508, and a second inspection tool 510. Computer system 502 includes a memory for storing product setup data 504. Computer system 502 is electrically coupled to first inspection tool 508 and second inspection tool 510 through communication link 506.

In one embodiment, the invention provides for an ability to share product setups between semiconductor inspection tools and achieve defect correlation without operator intervention where the following steps occur: (1) train a product on first inspection tool 508; (2) upload the product setup data 504 to computer system 502; (3) download the product setup data 504 from computer system 502 to second inspection tool 510; (4) inspect the product on first inspection tool 508 and second inspection tool 510; and (5) verify defect correlation greater than 99.997% on a known standard.

The obstacles of the prior art overcome using this method include: camera issues including gain and offsets, illumination issues, including light degradation, light levels between semiconductor inspection tools and flat fielding, and optics issues including magnification between objectives and optical distortions between objectives.

This occurs because the method of one embodiment of the present invention provides image matching, which transforms the images from machine #1 and machine #2 to a "Standard" image. This involves flat fielding, image warping, and scaling.

Accordingly, the invention as described above and understood by one of skill in the art is simplified, provides an effective, safe, inexpensive, and efficient device, system and process that achieves all the enumerated objectives, provides for eliminating difficulties encountered with prior devices, systems and processes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

What is claimed is:

1. An inspection system comprising:
  a first inspection tool comprising:
    a first camera for obtaining first images of a wafer;
    a first inspection light source for illuminating the wafer; and
    a first controller coupled to the first camera and the first inspection light source, the first controller configured for performing light source flat field correction, optical image warping correction, and optical image scale correction of the first images;
  a second inspection tool separate from the first inspection tool and of a same type as the
    first inspection tool, the second inspection tool comprising:
    a second camera for obtaining second images of the wafer;
    a second inspection light source for illuminating the wafer; and
    a second controller coupled to the second camera and the second inspection light source, the second controller configured for performing light source flat field correction, optical image warping correction, and optical image scale correction of the second images;
  wherein the first inspection tool and the second inspection tool are configured for product setup sharing such that the first images substantially match the second images, and
  wherein the first controller is configured to perform flat field correction by:
    illuminating a target with the first inspection light source;
    determining an average gray value of a sensor array of the first camera focused on the target;
    determining a normalizing factor at each pixel location of the sensor array by dividing the average gray value of the sensor array by the gray value at that pixel; and
    multiplying the normalizing factor for each pixel location to corresponding pixels of an inspection image.

2. The inspection system of claim 1, wherein the second controller is configured to perform flat field correction in substantially the same manner as the first controller is configured to perform flat field correction.

3. A method for configuring a first and a second inspection tool of the same type for product setup sharing, the method comprising:
  performing flat field correction on the first inspection tool;
  performing optical image warping correction on the first inspection tool;
  performing optical image scale correction on the first inspection tool;
  performing flat field correction on the second inspection tool;
  performing optical image warping correction on the second inspection tool; and
  performing optical image scale correction on the second inspection tool,
  wherein after performing the flat field correction, the optical image warping correction, and the optical image scale correction on both the first and second inspection tools, the first inspection tool provides substantially a same inspection image as the second inspection tool when inspecting a target that is substantially the same, and
  wherein performing flat field correction on the first inspection tool comprises:
    providing a target of substantially uniform reflectance in the first inspection tool;
    illuminating the target with an inspection light source;
    stepping the inspection light source through a plurality of light levels;
    determining an average gray value of a sensor array of a camera focused on the target at each of the plurality of light levels;
    determining the gray value of each pixel of the sensor array of the camera at each of the plurality of light levels; and
    determining a normalizing factor for each pixel of the sensor array at each of the plurality of light levels based on the average gray value and gray value of each pixel at each of the plurality of light levels.

4. The method of claim 3, wherein performing flat field correction on the first inspection tool further comprises:
  saving the normalizing factors for each pixel at each of the plurality of light levels to correct for flat fielding in inspection images.

* * * * *

UNITED STATES PATENT AND TRADEMARK OFFICE
CERTIFICATE OF CORRECTION

| | | |
|---|---|---|
| PATENT NO. | : 8,045,788 B2 | |
| APPLICATION NO. | : 10/890734 | |
| DATED | : October 25, 2011 | |
| INVENTOR(S) | : Cory Watkins et al. | |

It is certified that error appears in the above-identified patent and that said Letters Patent is hereby corrected as shown below:

Column 3, line 62, delete "10/890,862" and insert in place thereof --10/890,862,--.

Signed and Sealed this
Third Day of January, 2012

David J. Kappos
*Director of the United States Patent and Trademark Office*